(12) United States Patent
Mellen

(10) Patent No.: US 11,273,591 B2
(45) Date of Patent: Mar. 15, 2022

(54) BLOW MOULDING MACHINE SYSTEM AND METHOD

(71) Applicant: Integrated Plastics Pty Limited, Villawood (AU)

(72) Inventor: Nick Mellen, Villawood (AU)

(73) Assignee: Integrated Plastics Pty Limited, Villawood (AU)

(*) Notice: Subject to any disclaimer, the term of this patent is extended or adjusted under 35 U.S.C. 154(b) by 113 days.

(21) Appl. No.: 15/753,942

(22) PCT Filed: Aug. 12, 2016

(86) PCT No.: PCT/AU2016/000273
§ 371 (c)(1),
(2) Date: Feb. 20, 2018

(87) PCT Pub. No.: WO2017/024333
PCT Pub. Date: Feb. 16, 2017

(65) Prior Publication Data
US 2018/0243965 A1 Aug. 30, 2018

(30) Foreign Application Priority Data
Aug. 12, 2015 (AU) .............................. 2015903235

(51) Int. Cl.
*B29C 49/06* (2006.01)
*B29C 49/78* (2006.01)
(Continued)

(52) U.S. Cl.
CPC ............ *B29C 49/786* (2013.01); *B29B 11/14* (2013.01); *B29C 49/0073* (2013.01);
(Continued)

(58) Field of Classification Search
CPC ......... B29C 49/06; B29C 49/30; B29C 49/28; B29C 9/64; B29C 49/42; B29C 49/78; B29C 49/24; B29C 49/4252
See application file for complete search history.

(56) References Cited

U.S. PATENT DOCUMENTS

| 8,807,986 | B2* | 8/2014 | Beale | B29C 49/6463 425/534 |
| 9,004,905 | B2* | 4/2015 | Humele | B29C 49/28 425/162 |
| 2013/0011807 | A1* | 1/2013 | Winzinger | B29B 13/024 432/43 |

FOREIGN PATENT DOCUMENTS

| EP | 0835736 | 4/1998 |
| EP | 1510319 | 3/2005 |

(Continued)

OTHER PUBLICATIONS

International Search Report and Written Opinion dated Dec. 16, 2016 in PCT Application No. PCT/AU2016/000273.

*Primary Examiner* — Matthew J Daniels
*Assistant Examiner* — Shibin Liang
(74) *Attorney, Agent, or Firm* — Knobbe, Martens, Olson & Bear, LLP

(57) ABSTRACT

A blow moulding machine for producing blown containers with an integrally formed handle; the machine including a preform injection moulding stage wherein the preform comprising a body portion, a neck portion and an integrally moulded handle; the machine further including a handle orientation stage, a preform conditioning stage and a blow moulding stage, and wherein the preform is nested in cavities provided in opposing portions of a conditioning module; the integrally moulded handle nested in cavities lined with an insulating material. Also disclosed is a method of producing a blown container with an integrally formed (Continued)

handle in a blow moulding machine; the blow moulding machine including a preform injection moulding stage for moulding a preform comprising a body portion and an integrally moulded handle; the blow moulding machine further including a handle orienting stage, a preform conditioning stage and a blow moulding stage; the method including the steps of: —Injection moulding the preform with an integrally moulded handle, —Orienting the handle of the preform into a predetermined orientation, —Transferring the preform to a preform conditioning module, —Transferring the preform from the preform conditioning module to a die of a blow moulding machine when the preform body and integrally moulded handle are at predetermined temperatures, —Blowing the container in the blow moulding machine, and wherein the preform is nested in cavities provided in opposing portions of the conditioning module; the integrally moulded handle nested in cavities lined with an insulating material.

24 Claims, 8 Drawing Sheets

(51) Int. Cl.
*B29C 49/68* (2006.01)
*B29C 49/64* (2006.01)
*B29B 11/14* (2006.01)
*B29C 49/00* (2006.01)
*B29C 49/42* (2006.01)
*B29L 31/00* (2006.01)

(52) U.S. Cl.
CPC .......... *B29C 49/06* (2013.01); *B29C 49/4205* (2013.01); *B29C 49/64* (2013.01); *B29C 49/6436* (2013.01); *B29C 49/68* (2013.01); *B29B 2911/1454* (2013.01); *B29B 2911/14513* (2013.01); *B29C 2049/4226* (2013.01); *B29C 2949/78151* (2013.01); *B29C 2949/78386* (2013.01); *B29C 2949/78663* (2013.01); *B29C 2949/78899* (2013.01); *B29L 2031/712* (2013.01)

(56) References Cited

FOREIGN PATENT DOCUMENTS

FR 2494179 5/1982
WO WO-2008090324 A2 * 7/2008 ......... B29C 49/0073

* cited by examiner

BLOW MOULDING MACHINE SYSTEM AND METHOD

RELATED APPLICATIONS

This application is the U.S. National Phase of PCT/AU2016/000273 filed Aug. 12, 2016 and claims priority to Australian Provisional Patent Application No. 2015903235 filed Aug. 12, 2015, which is hereby incorporated herein by reference in their entirety.

TECHNICAL FIELD

The present invention relates to the blow moulding of containers from prior injection moulded preforms and, more particularly, to an integrated system and method for the production of a blow moulded container which includes an integrally formed handle.

BACKGROUND

The blow moulding of containers with integral handles from injection moulded preforms is known. For example aspects of this technology have been described in WO 207/101309, which discloses a preform of generally cylindrical body with a handle projecting from the side of the body.

For blow moulding in PET polymer, it is necessary that the body of the preform be brought to a suitable temperature prior to entry into the blow moulding die. But excessive heat applied to the handle during the preheating phase will distort the handle so that shielding of the handle without impeding the even heating of the body of the preform is required.

Some arrangements for preheating are disclosed in the above referenced citation, but have been found difficult to implement and have produced less than optimum results. Moreover, a more efficient process is desirable in which preforms while still at relatively elevated temperatures, are quickly transferred to a conditioning stage and thence to the blow moulding stage in an integrated system.

For some applications, it is desirable to "dope" the polymer with a metallic additive to provide a light barrier. These metallic barriers give the preform a reflective property making the preheating in a conventional heat tunnel difficult.

It is an object of the present invention to address or at least ameliorate some of the above disadvantages or provide a useful alternative.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Accordingly, in one broad form of the invention, there is provided a blow moulding machine for producing blown containers with an integrally formed handle; the machine including a preform injection moulding stage wherein the preform comprising a body portion, a neck portion and an integrally moulded handle; the machine further including a handle orientation stage, a preform conditioning stage and a blow moulding stage, and wherein the preform is nested in cavities provided in opposing portions of a conditioning module; the integrally moulded handle nested in cavities lined with an insulating material.

Preferably, the preform conditioning stage includes a recirculating conveyor provided with a plurality of preform conditioning modules.

Preferably, the opposing portions of each preform conditioning module comprise a pair of complementary blocks; opposing faces of the blocks provided with cavities for the body portion and the integrally moulded handle of the preform; the pair of complementary blocks enclosing a preform within the cavities when the blocks are closed in a face to face condition.

Preferably, portions of the cavities for the integrally moulded handle are lined with an insulating material.

The machine of any one of claims 2 to 4 wherein the pair of complementary blocks are provided with heating means.

Preferably, the pair of complementary blocks are provided with heating and cooling means.

Preferably, the heating means are arranged in heating zones to provide selected degrees of heating to different portions of the body portion of the preform.

Preferably, the cooling means provide for cooling of the integrally moulded handle when the integrally moulded hand enters the conditioning module at a temperature above ambient.

Preferably, the pair of complementary blocks of the conditioning module are provided with sensors to monitor temperatures of the heating zones.

Preferably, heating levels of the heating zones are under computer control.

Preferably, a preform is transferred from the handle orientation stage to one of the preform conditioning modules by a pick and place device or a robot.

Preferably, a preheated preform is transferred from a preform conditioning module to a blow moulding die of the blow moulding machine by a pick and place device or a robot.

In another broad form of the invention, there is provided a method of producing a blown container with an integrally formed handle in a blow moulding machine; the blow moulding machine including a preform injection moulding stage for moulding a preform comprising a body portion and an integrally moulded handle, a handle orienting stage, a preform conditioning stage and a blow moulding stage; the method including the steps of:

injection moulding the preform with an integrally moulded handle, orienting the handle of the preform into a predetermined orientation, transferring the preform to a preform conditioning module, transferring the preform from the preform conditioning module when the preform body and integrally moulded handle are at predetermined temperatures to a die of a blow moulding machine, blowing the container in the blow moulding machine, and wherein the preform is nested in cavities provided in opposing portions of the conditioning module; the integrally moulded handle nested in cavities lined with an insulating material.

Preferably, heating zones in the preform conditioning module apply differentiated degrees of heating to different areas of the body portion of the preform.

Preferably, heating and cooling zones in the preform conditioning module apply differential degrees of heating and cooling to different regions of the body portion and handle of the preform Preferably, the heating and/or cooling zones are monitored by temperature sensors.

Preferably, the differentiated degrees of heating and/or cooling are under computer control.

Preferably, transfer of a preform from the stage of handle orientation to a module of the preform conditioning stage is by a pick and place device or robot.

Preferably, transfer of a preform from a preform conditioning module is by a pick and place device or robot.

BRIEF DESCRIPTION OF DRAWINGS

Embodiments of the present invention will now be described with reference to the accompanying drawings wherein.

DESCRIPTION OF EMBODIMENTS

Figure 1:
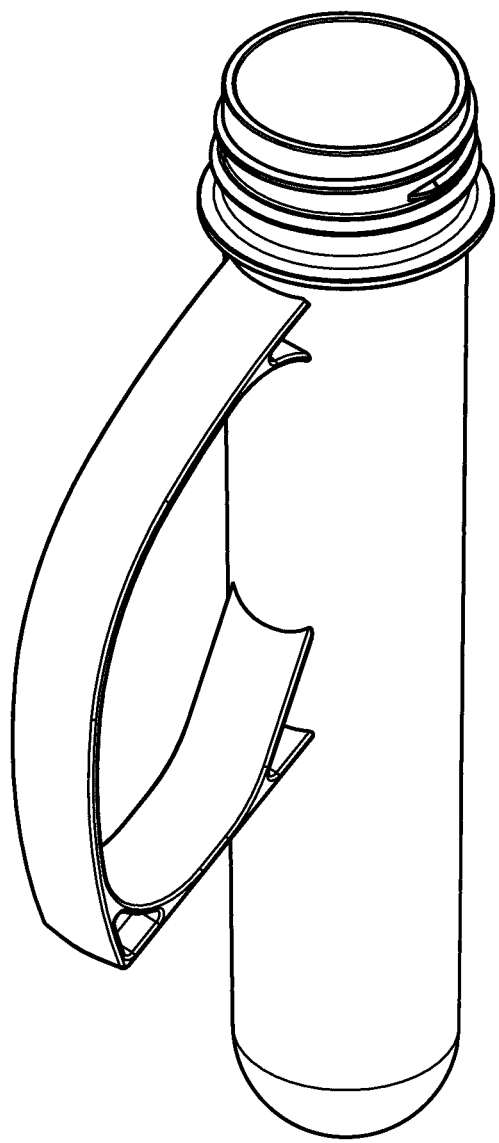
FIG. 1 is a perspective view of an injection moulded preform for use in the blow moulding machine and system of the invention.

The process of stretch blow-moulding containers from suitable polymers includes at least two stages. In a first stage, preforms are injection moulded in an injection moulding machine in which the polymer, in a molten state is injected into one or more cavities of an injection moulding die. The injection moulded preform is essentially a hollow body, typically of tubular form closed at its lower end and, as in the present case where it is intended to become a bottle-like container, with the final features of the bottle neck and thread detail for a screw cap already formed. As well, in the present invention, the preform is injection moulded complete with an integrally attached handle as shown in FIG. 1.

In one known arrangement, the preforms, may be produced by injection moulding at a location geographically remote from the blow-moulding operation, or at least as a separate production unit from that of the blow moulding stage, and preforms may be left to cure and cool for some time, at least reducing their temperature to ambient, before being subjected to the blow-moulding of the container.

In one arrangement of the system of the present invention however, injection moulded preforms pass almost directly from the injection moulding stage while still at or near the relatively elevated typical temperature of 40 degrees, to the stretch blow-moulding machine to be formed into the finished container.

Regardless of the arrangement employed, the temperature of the preform at the point at which it enters the blow-moulding die is critical and may require the preform passing through a conditioning stage in which the preform is brought to an optimum temperature, typically 115 degrees, for blow moulding of the container. This is particularly so in the case of the present invention in which the container is one with an integrally moulded handle.

The handle makes the process considerably more complicated than that for symmetrical containers and is complicated by the integral handle both in the manner in which the preform is handled between the injection moulding and blow-moulding stages, and its presentation to, and passage through and extraction from, a conditioning stage.

In respect of handling of the preform, it is essential that the preform be presented to the conditioning stage and the blow moulding die with the handle oriented correctly for respectively, shielding the handle from excessive heating and the subsequent nesting in the blow moulding die.

Figure 2:
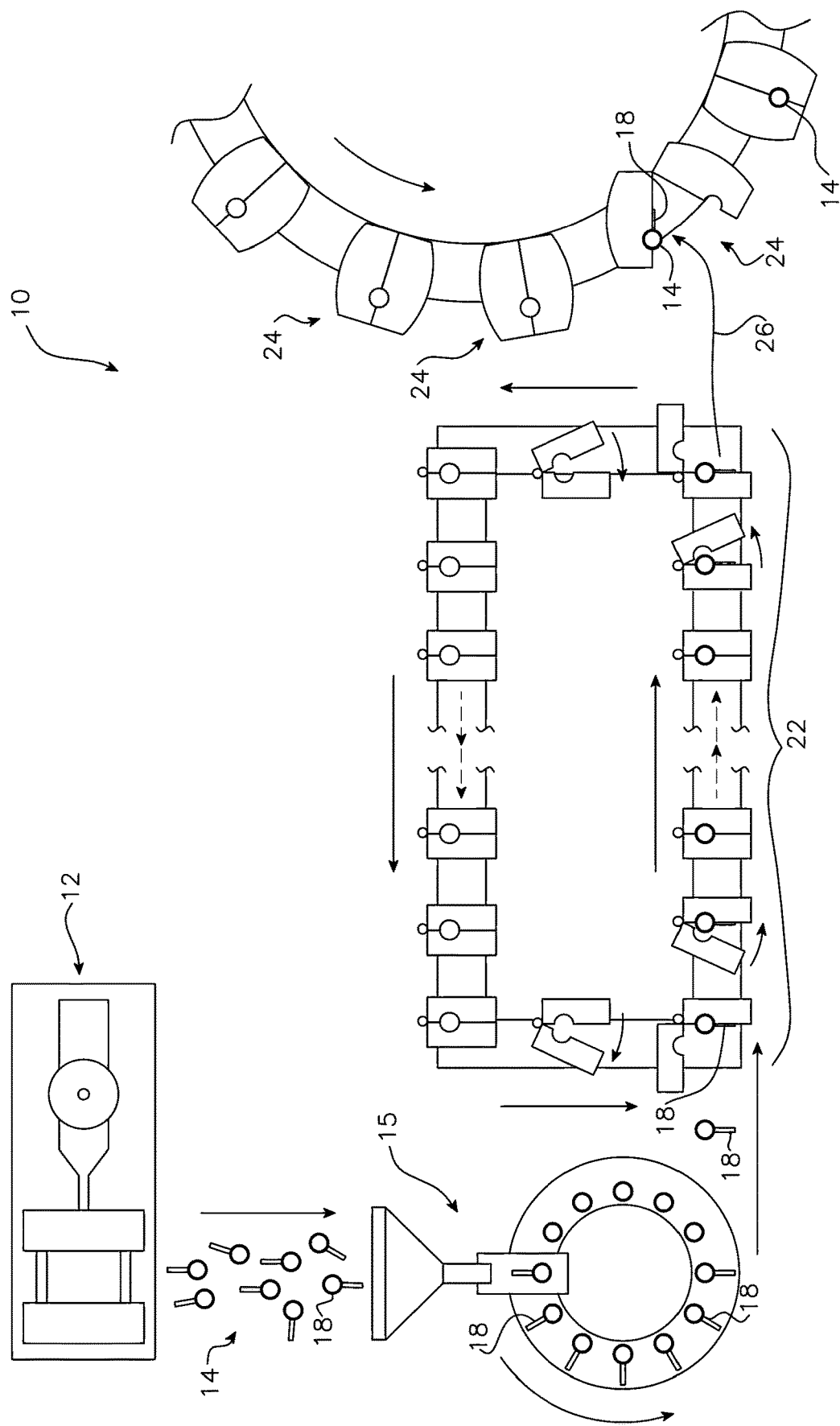
FIG. 2 is a diagrammatic plan view showing the major components and processes of the blow moulding machine and system.

FIG. 2 shows in diagrammatic form the principle components of an integrated blow moulding production machine 10 according to the present invention, in which an injection moulding press 12 produces preforms 14 which pass through an orientation device 16, to orient the handle 18 of the preform in a predetermined orientation. The orientation may be imposed by the mechanism described in WO 2007/101309.

A pick and place device (or robot) 20 transfers preforms 14, while maintaining their imposed orientation, to a conditioning stage 22. At the end of the conditioning stage 22, the preheated preforms are loaded into the blow moulding die 24 by a second pick and place device or robot 26.

Figure 2A:
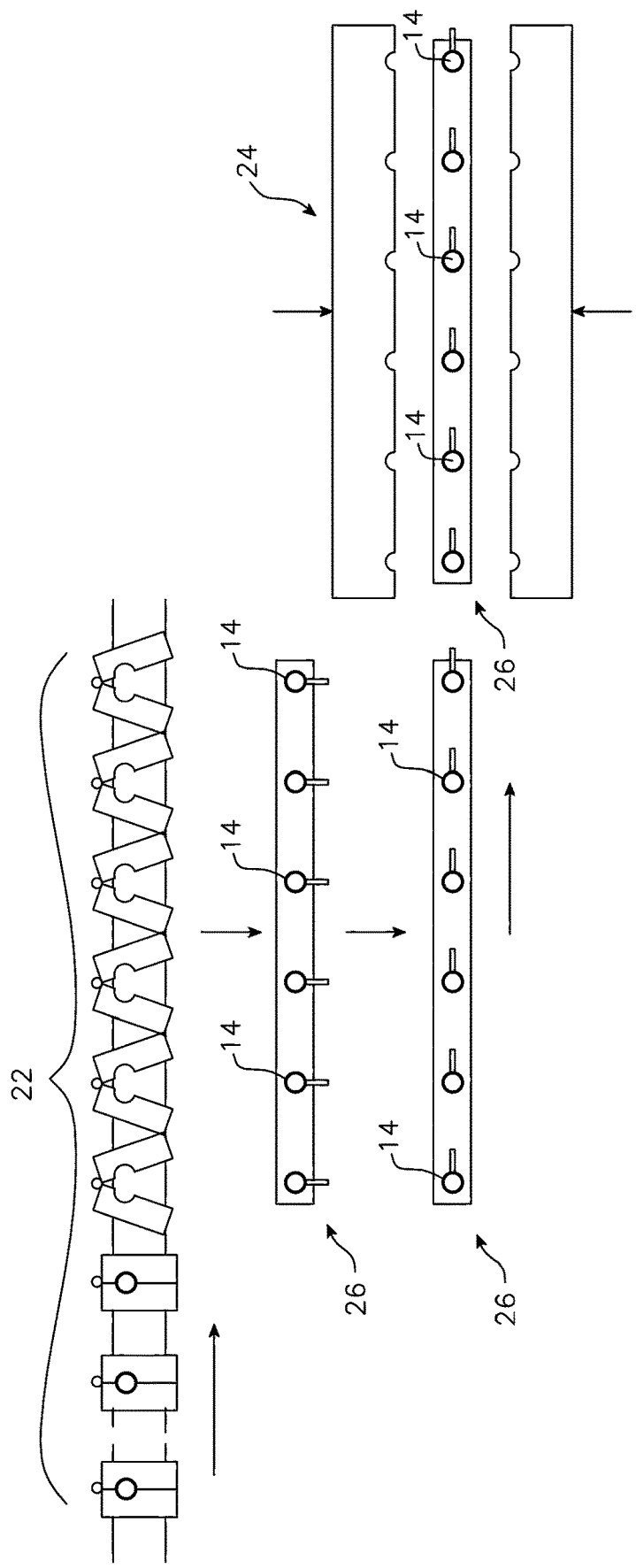
FIG. 2A is a schematic variation on the process of FIG. 2 in which multiple preforms are presented to a blow moulding machine.

Although FIG. 2 shows the removal from the conditioning stage 22 and loading into the blow moulding tooling of preforms one at a time, it will be understood, as shown in FIG. 2A, that multiple preforms may be extracted by a suitable pick and place device 26 at each cycle of the stretch blow moulding process and loaded into a multi-cavity blow moulding tool 24.

The preferred embodiments of the critical conditioning stage will now be described in detail.

Conditioning Stages

First Preferred Embodiment

Figure 3:
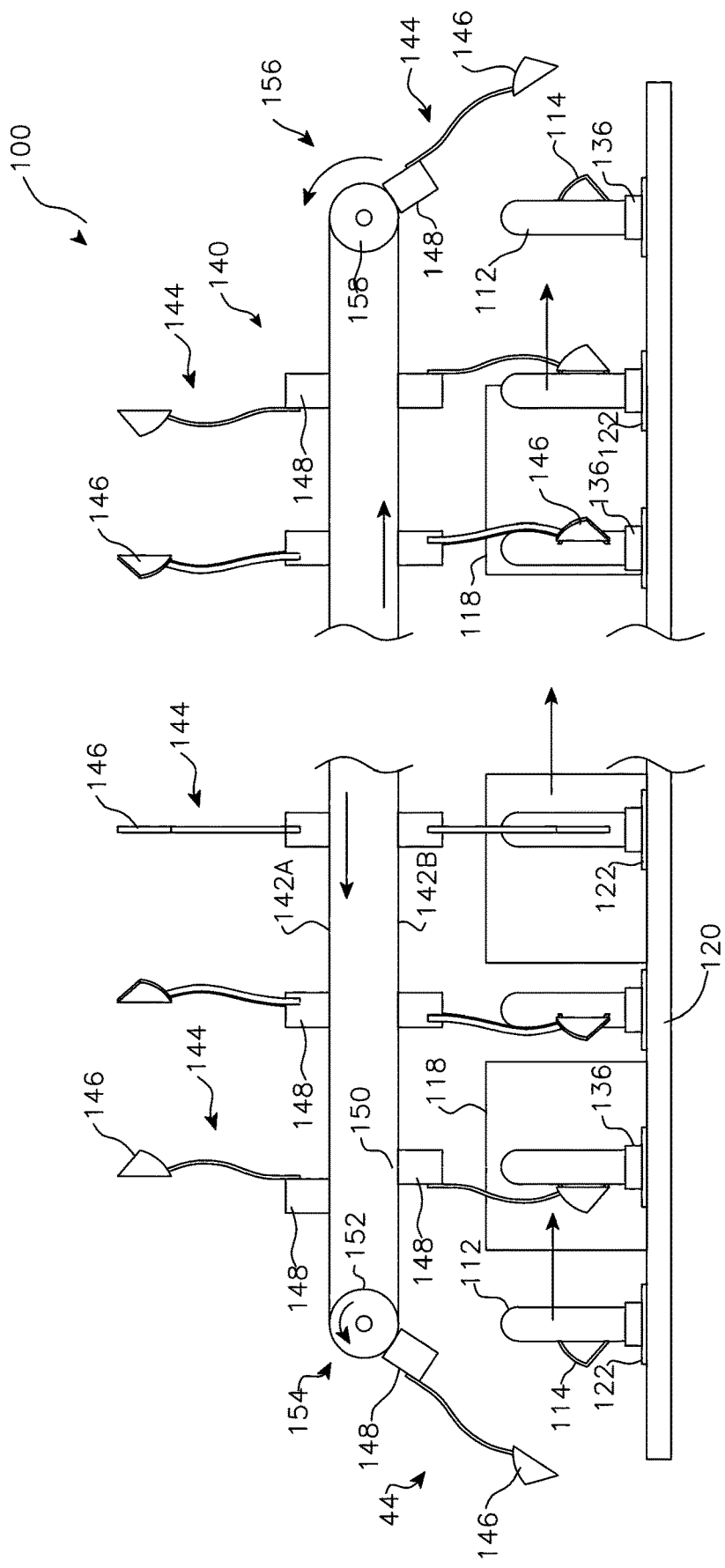
FIG. 3 is a side elevation view of a conditioning arrangement for the preheating of the preform of FIG. 1 according to a first preferred embodiment of the invention.
Figure 4:
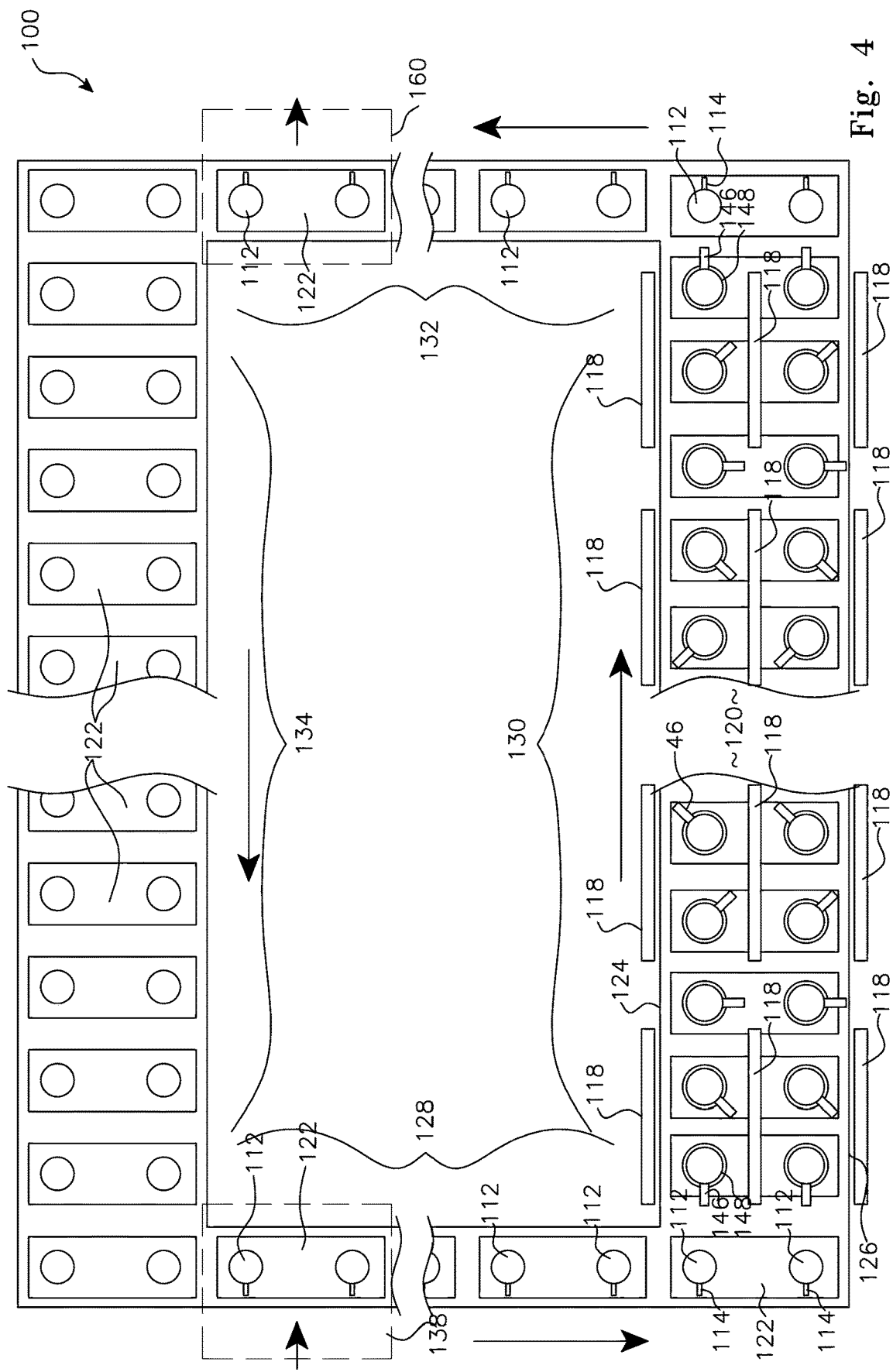
FIG. 4 is a plan view of the arrangement of FIG. 3.

With reference to FIGS. 3 and 4, a preform heating arrangement 100 for the preheating of preforms 112 which include an integral handle 114, comprises a preform transport system 116 and an array of heating modules 118 arranged along a preform heating corridor 120. Preferably, the preforms 112 pass along the preform heating corridor 120 two or more abreast as shown in FIG. 4, and in a preferred arrangement, the preforms are arranged in pairs, supported side by side on transport system carriages 122.

As best seen in FIG. 4, the heating modules 118 are arranged along the length of the preform heating corridor 120, being arranged along opposing outer edges 124, 126 of the preform heating corridor 120, and along a median line between the pairs of preforms.

The transport system carriages 122 recirculate incrementally around a rail system which includes an approach rail 128 leading to the preform heating corridor 120, a preform heating corridor rail 130, an exit rail 132 leading away from the preform heating corridor rail 130 and a carriage return rail 134.

The carriages 122 are provided with a pair of rotatable mandrels 136 for support of the preforms 112. As can be seen from FIG. 4, the rails of the transport system 116 are arranged so that the carriages 122 maintain the same alignment as they proceed along each of the rails. Thus along the approach rail 128 and the exit rail 132, the pairs of mandrels are aligned with the axis of the rails, while along the preform heating corridor rail 130 and the carriage return rail 134, the pairs of mandrels are aligned normal to the axes of the rails.

The rotatable mandrels 136 are pre-loaded with a pair of preforms 112 at a preform loading and orienting station 138 along the approach rail 128 and are oriented so that the integral handles 114 of the preforms projecting radially from the surface of the generally cylindrical bodies of the preforms, project rearwardly relative the direction of travel along the preform heating corridor rail 130.

Referring now to FIG. 3, a conveyor system 140 is arranged over and aligned with the preform heating corridor 120. Although only one conveyor is shown in FIG. 3 (and none are shown in FIG. 4 for clarity), the conveyor system 140 comprises two identical conveyors, each aligned with the preform heating corridor 120 and spaced apart to conform to the spacing of the pairs of preforms on the carriages 122.

Supported at intervals along the strands 142 of the conveyors are handle cover assemblies 144. Each handle cover assembly 144 includes a handle cover 146 attached to a rotation mechanism 148. The rotation axis 150 of the rotation mechanism 148 is aligned with the axis of the generally cylindrical body of the preform 112 when the handle cover 46 has been applied to the handle 114 of a preform.

The conveyors are arranged such that the handle cover assemblies 144 travel along the preform heating corridor 120 at a rate synchronous with the movement of carriages 122 along the preform heating corridor.

The rotation mechanism 148 of each handle cover assembly 144 causes each cover assembly to complete a predetermined number of 360 degree rotations of the handle cover 146 and thus the preform 112 to which the handle cover is applied, over the length of the transport corridor.

It can be seen again from FIG. 3 that a pair of handle cover assemblies 144 at the point of being rotated around the conveyor's first end pulleys 152 from being on the upper strands 142A to the being on the lower strands 142B of a conveyors, have been rotated by their rotation mechanisms 148 such that the handle covers 146 are aligned with the handles 114 of the pair of preforms awaiting the application of the handle covers at the first end 144 of the preform heating corridor 120.

Similarly, at the end of the predetermined number of 360 degree rotations and with the preforms 112 arrested at the second opposite end 46 of the preform heating corridor 120, the handles 114 of the pair of preforms now project in a forward direction relative the direction of travel along the preform heating corridor 120, allowing for disengagement of the handle covers 146 from the handles 114 as the handle cover assemblies 144 are rotated around the conveyor second end pulley 158.

Once free of the handle covers, the pair of preforms on their supporting carriage, are incremented along the exit rail 132 to an unloading station 160 for insertion into the blow moulding stage of the blow moulding machine.

Second Preferred Embodiment

Figure 5:
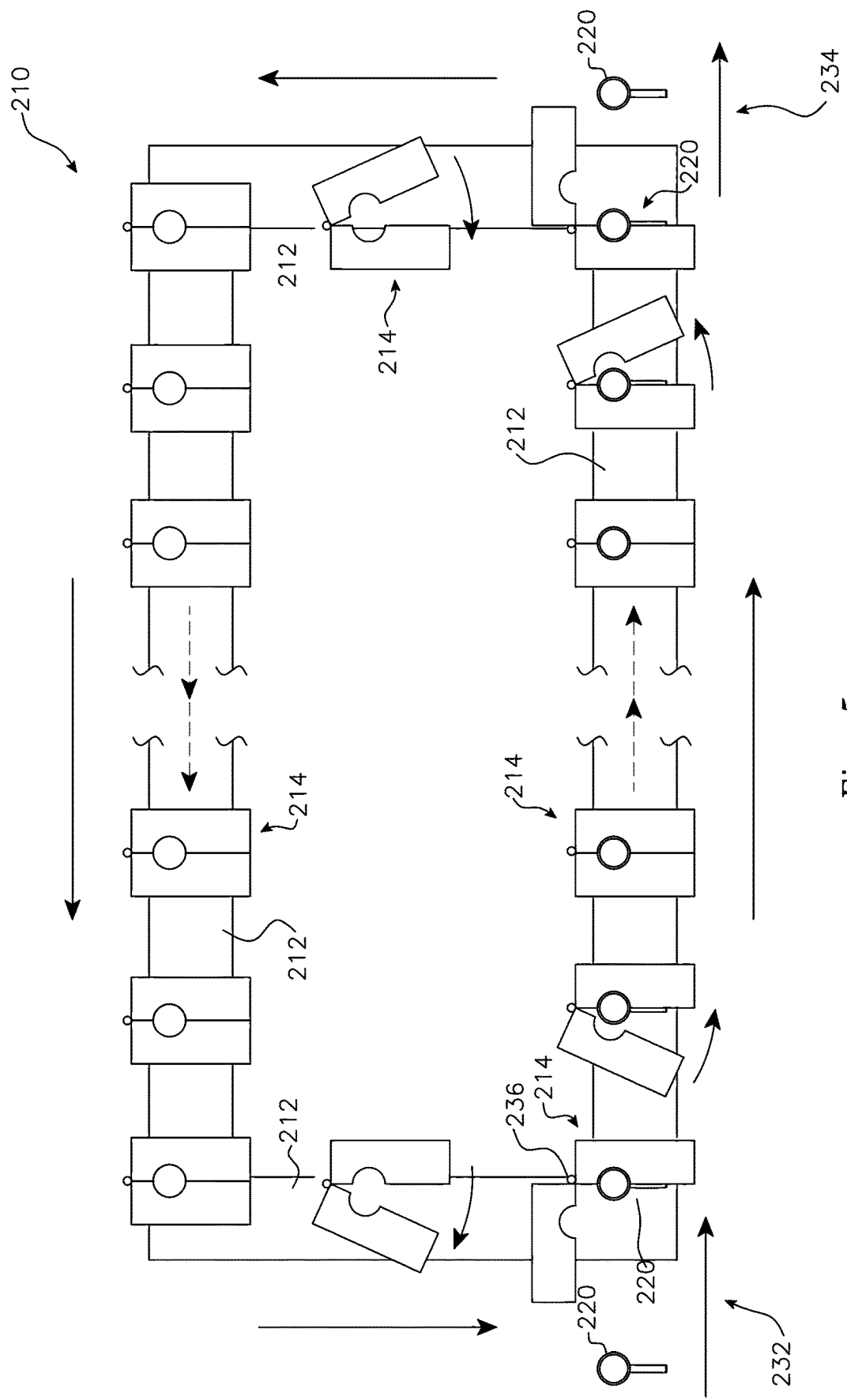
FIG. 5 is a perspective view of a preheating module according to a further preferred arrangement for conditioning of the preform of FIG. 1.
Figure 6:
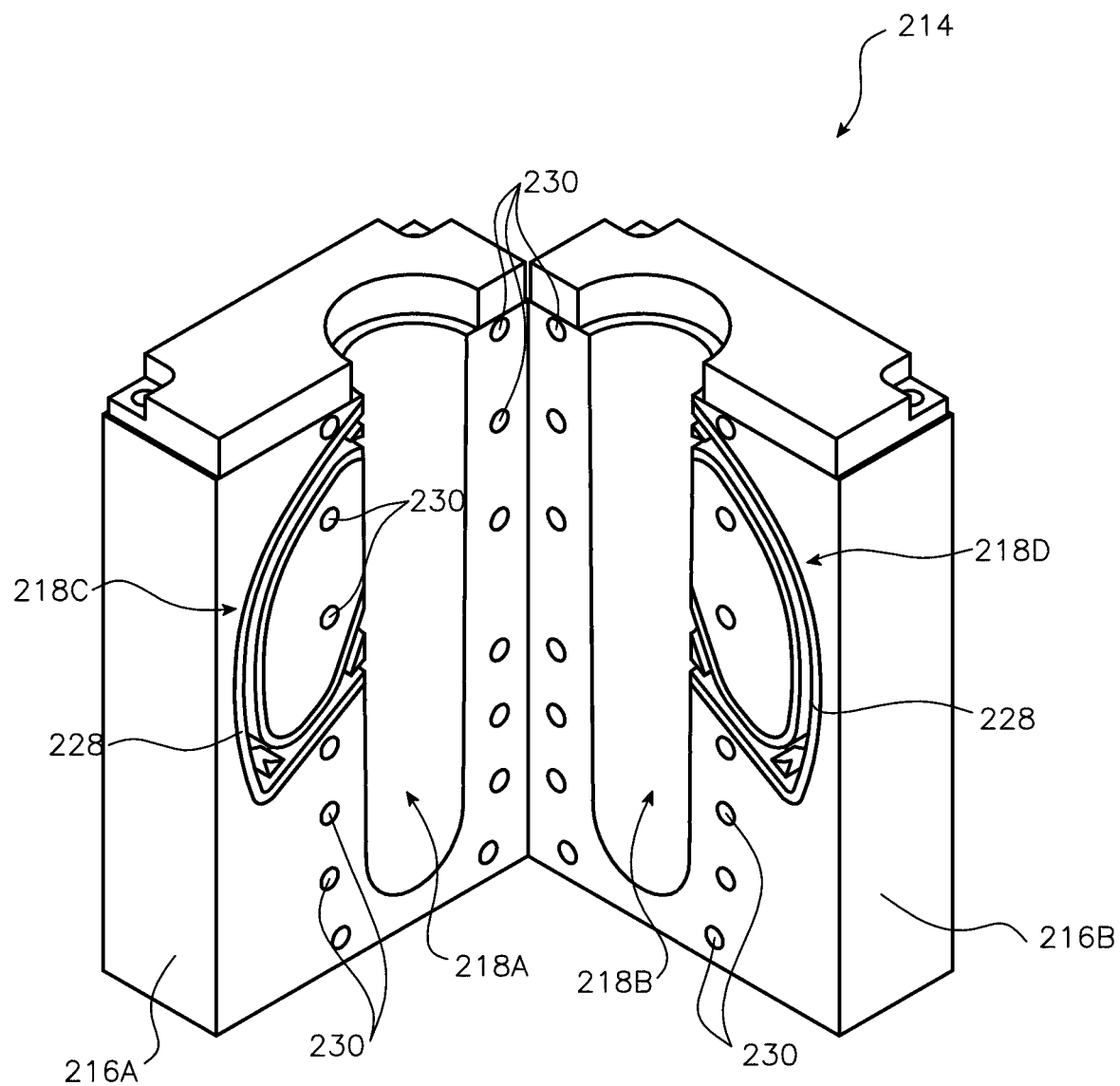
FIG. 6 is a further perspective view of a conditioning module of the arrangement of FIG. 5 with the preform of FIG. 1 inserted prior to closure of the module.
Figure 7:
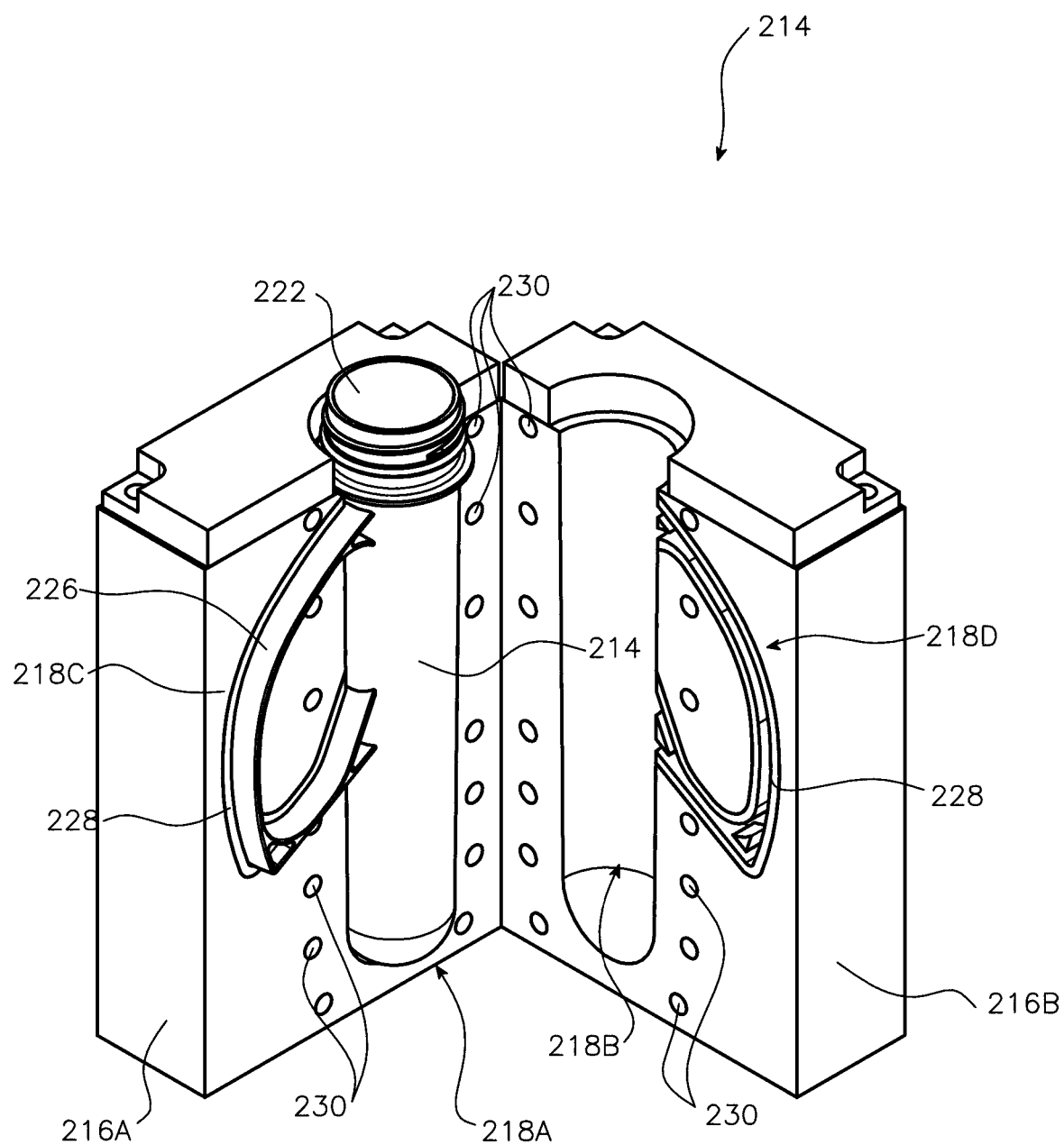
FIG. 7 is a plan view of a preferred system for transporting the conditioning modules of FIGS. 5 and 6 between handle orientation and a blow moulding machine of the system.

With reference to FIG. 5, in a second preferred embodiment of a conditioning stage 210 according to the invention, a recirculating conveyor loop 212 is provided with a number of preform conditioning modules 214. As best seen in FIGS. 6 and 7, each module 214 comprises a pair of complementary half blocks 216A and 216B in the manner of an injection moulding die, each half having a cavity 218A and 218B which, when the blocks are closed face to face, form a cavity conforming to the shape of the preform 220 (see FIG. 7) below the neck portion 222 of the preform.

While the tubular body portion 224 of the preform 220 is nested closely within the cavities 218A, 218B, the parts 218C and 218D of the cavities which are formed to accommodate the integral handle 226 of the preform, are expanded to allow for the insertion of insulating material 228, such as for example a heat resistant polymer into which the handle 226 is nested.

The half blocks 216A and 216B are provided with internal heating means 230 which, when the blocks are closed, surround the tubular portion 224 of the preform. Preferably the heating means 230 are in the form of electric elements but could be passages for the circulation of hot liquid or air.

Preferably the heating means 230 are arranged in zones to provide differential heating to different sections of the body of the preform while the handle 226 is substantially protected from any heating by its nesting in the insulation lined handle portion of the cavities 218C, 218D. The half blocks 216A and 216B may be provided with heat sensors (not shown) to monitor the heating zones of the heating means 230 which then allows for precise computer control for optimum temperature control of the preform.

In one preferred form, at least some of the heating means 230 are adapted to provide cooling to the handle, for example by passing a cooling liquid or air through passages, to bring the temperature of the handle to ambient, if the handle is at elevated temperature as received from the injection moulding stage. Similarly, excessive heating of the neck of the preform by conducted heat through the metal half blocks can be prevented by suitably place cooling passages adjacent to the neck region.

With reference again to FIG. 4, the half blocks 216A and 216B of the preheating modules are arranged as a series around the recirculating conveyor loop 212. The modules 214 open for insertion of a preform 220 as each module approaches, or arrives at, the loading end 232 of the recirculating conveyor loop 212.

After loading with a preform, the module closes and is carried by the conveyor towards the discharge end 234 during which time of transit the preform 220 is brought to the optimal blow moulding temperature by the heating means 230. The modules open as they approach, or arrive at, the discharge end 234 for extraction of the preform.

Opening of the blocks 216A, 216B of the module 214 may be arranged by hinging the blocks at their respective common edge 236 as shown in FIGS. 4 and 5, or by one of the two blocks being mounted on a slide system (not shown), to move away from the other fixed block. Either way, this opening or separation may be effected by suitable cams and guide rails, or by actuators arranged adjacent to the loading end 232 and discharge end 234.

Since the heating takes place within the heating modules 214, rotation of the preform is not required during its transit between loading and discharge ends of the conveyor loop 212 so that the orientation of the handle is automatically maintained.

The number of modules 214 in transit (and therefore the size of the recirculating conveyor loop 212) is a function of the output (number of cavities and cycle time) of the injection moulding die, the differential temperature between the as moulded preforms and the optimum temperature desired for the blow moulding process, as well as the efficiency of the heating means of the modules.

This second preferred embodiment has a number of advantages over that of the first preferred embodiment described above. Firstly it provides for very precise heating control. Secondly, the handle is completely protected from distortion by excessive heating of the handle. Thirdly it allows for a more compact and less complicated conditioning stage.

A further advantage is that the application of heat directly to a preform which is closely nested in a conditioning module of this embodiment, overcomes the reflectivity problem associated with preforms in which the polymer has been treated with a metallic barrier additive.

INDUSTRIAL APPLICABILITY

The arrangements described above provide efficient and practicable mechanisms for the conditioning of preforms where control of orientation of the preform and protection of the integral handle of the preform is critical.

The invention claimed is:

1. A blow moulding machine for producing blown containers with an integrally formed handle; the machine receiving injection moulded preforms wherein each preform comprises a body portion, a neck portion and an integrally moulded handle; the machine further including a handle orientation stage, a preform conditioning stage and a blow moulding stage; wherein the machine maintains a predetermined fixed rotational orientation of the handle relative to conditioning elements of the preform conditioning stage while progressing the preform through the preform conditioning stage and wherein heating and cooling zones in the conditioning elements apply differential degrees of heating and cooling to different regions of the body portion and handle of the preform; and wherein orientation of the integrally moulded handle is controlled for presentation to the preform conditioning stage and for the blow moulding stage.

2. The machine of claim 1 wherein the preform conditioning stage includes a recirculating conveyor provided with a plurality of preform conditioning modules.

3. The machine of claim 2 wherein the opposing portions of each preform conditioning module comprise a pair of complementary blocks; opposing faces of the blocks provided with cavities for the body portion and the integrally moulded handle of the preform; the pair of complementary blocks enclosing a preform within the cavities when the blocks are closed in a face to face condition.

4. The machine of claim 3 wherein portions of the cavities for the integrally moulded handle are lined with an insulating material.

5. The machine of claim 2 wherein the pair of complementary blocks are provided with heating means.

6. The machine of claim 2 wherein the pair of complementary blocks are provided with heating and cooling means.

7. The machine of claim 5 where the heating means are arranged in heating zones to provide selected degrees of heating to different portions of the body portion of the preform.

8. The machine of claim 6 wherein the cooling means provide for cooling of the integrally moulded handle when the integrally moulded handle enters the conditioning module at a temperature above ambient.

9. The machine of claim 5 wherein the pair of complementary blocks of the conditioning module are provided with sensors to monitor temperatures of the heating zones.

10. The machine of claim 5 wherein heating levels of the heating zones are under computer control.

11. The machine of claim 1 wherein a preform is transferred from the handle orientation stage to one of the preform conditioning modules by a pick and place device or a robot.

12. The machine of claim 1 wherein a preheated preform is transferred from a preform conditioning module to a blow moulding die of the blow moulding machine by a pick and place device or a robot.

13. The machine of claim 1 wherein the machine includes a preform injection moulding stage; injection moulded preforms passing from the injection moulding stage to the blow-moulding stage of the machine.

14. The machine of claim 1 wherein the preforms are produced in injection moulding machines located geographically remote from the blow moulding machine.

15. The machine of claim 1 wherein the integrally moulded handle forms a loop of polymer material extending from a first connection point on the body portion of the preform to a second connection point.

16. A method of producing a blown container with an integrally formed handle in a blow moulding machine; the blow moulding machine receiving injection moulded preforms from an injection moulding stage; each preform comprising a body portion and an integrally moulded handle; the blow moulding machine further including a handle orienting stage, a preform conditioning stage and a blow moulding stage; the method including the steps of:
  Injection moulding the preform with an integrally moulded handle,
  Orienting the handle of the preform into a predetermined orientation,
  Transferring the preform to a preform conditioning stage,
  Maintaining the predetermined orientation of the handle relative to conditioning elements of the preform conditioning stage, wherein the predetermined orientation of the handle is fixed relative to the conditioning elements while progressing the preform through the preform conditioning stage,
  Transferring the preform from the preform conditioning stage to a die of a blow moulding machine when the preform body and integrally moulded handle are at predetermined temperatures,
  Blowing the container in the blow moulding machine; and wherein heating and cooling zones in the conditioning elements apply differential degrees of heating and cooling to different regions of the body portion and handle of the preform; and
  wherein orientation of the integrally moulded handle is controlled for presentation to the preform conditioning stage and for the blow moulding stage.

17. The method of claim 16 wherein heating zones in the preform conditioning module apply differentiated degrees of heating to different areas of the body portion of the preform.

18. The method of claim 16 wherein the heating and/or cooling zones are monitored by temperature sensors.

19. The method of claim 16 wherein the differentiated degrees of heating and/or cooling are under computer control.

20. The method of claim 16 wherein transfer of a preform from the stage of handle orientation to a module of the preform conditioning stage is by a pick and place device or robot.

21. The method of claim 16 wherein transfer of a preform from a preform conditioning module is by a pick and place device or robot.

22. The method of claim 16 wherein the machine includes a preform injection moulding stage; injection moulded preforms passing from the injection moulding stage to the blow moulding stage of the machine.

23. The method of claim 16 wherein the preforms are produced in injection moulding machines located geographically remote from the blow moulding machine.

24. The method of claim 16 wherein the integrally moulded handle forms a loop of polymer material extending from a first connection point on the body portion of the preform to a second connection point.

\* \* \* \* \*